United States Patent [19]

Hacskaylo

[11] Patent Number: 5,065,026

[45] Date of Patent: Nov. 12, 1991

[54] THERMAL BLACK-HOLE MASK

[75] Inventor: Michael Hacskaylo, Falls Church, Va.

[73] Assignee: The United States of America as represented by the Secretary of the Army, Washington, D.C.

[21] Appl. No.: 606,737

[22] Filed: Feb. 16, 1984

[51] Int. Cl.$^5$ ............................................. G01J 1/00
[52] U.S. Cl. .................................. 250/352; 250/330; 250/353; 250/526
[58] Field of Search ............... 250/341, 342, 352, 353, 250/330, 526

[56] References Cited

U.S. PATENT DOCUMENTS 3,780,293 12/1973 Flint ...................................... 250/352
4,222,632 9/1980 Eichweber ........................ 350/96.10
4,421,985 12/1983 Billingsley et al. ................. 250/352

FOREIGN PATENT DOCUMENTS 2848072 5/1980 Fed. Rep. of Germany.

Primary Examiner—Stephen C. Buczinski
Attorney, Agent, or Firm—Milton W. Lee; Anthony T. Lane

[57] ABSTRACT

The black hole which a cryogenically-cooled infrared (thermal) detector creates in a scene being observed by another such detector is obscured by inserting a partial transmitter-reflector on the optical axis of the detector. A black-body radiator projects an ambient-temperature image the same size and shape as the black hole onto the transmitter-reflector such that the other detector sees a combined image with no apparent black hole.

4 Claims, 1 Drawing Sheet

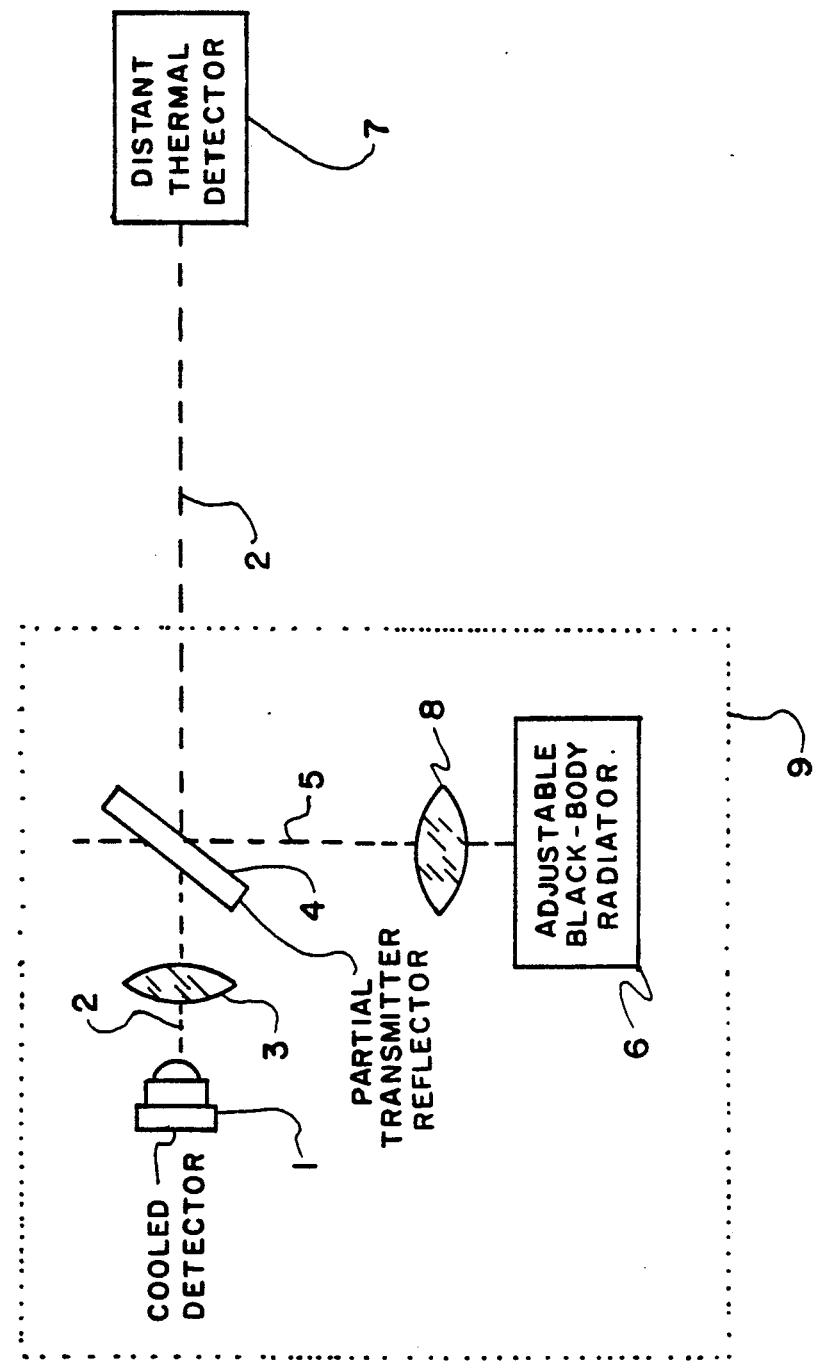

THERMAL BLACK-HOLE MASK

The invention described herein may be manufactured, used, and licensed by the U.S. Governmment for governmental purposes without the payment of any royalties thereon.

BACKGROUND OF THE INVENTION

This invention is in the field of infrared (thermal) detectors. Such detectors are undergoing increasing civilian, police, and military uses nowadays. Some infrared detectors can operate only if cooled to cryogenic temperatures, or can only operate efficiently at these temperatures. Unfortunately, this creates a possible problem for some users; in the case of a military user, for example, an enemy equipped with a thermal viewer can "see" the military user's detector because of the "black hole" that its cooled detector creates in a scene. The present invention solves this problem.

SUMMARY OF THE INVENTION

This invention is a mask for the "black hole" made in an ambient temperature scene by a cryongenically-cooled first thermal detector, when the scene is observed by a second thermal detector. The mask includes an inclined partially-reflecting mirror along the optical axis of the first detector, and a black-body radiator arranged such that its radiation is reflected from the mirror along the optic axis away from the first detector. The black-body radiator is adjusted in accordance with the ambient temperature of the scene in which the first detector is used and has a congruent image to the black hole. The black hole is thus obscured.

BRIEF DESCRIPTION OF THE DRAWING

The single drawing FIGURE is a schematic showing of the invention.

DETAILED DESCRIPTION OF PREFERRED EMBODIMENT

The invention may be best understood when this description is taken in conjunction with the drawing. In the drawing figure, 1 designates a cyrogenically cooled thermal (infrared) detector. Such detectors are well known in the art, and different ones use different detector materials cooled to different temperatures, depending upon particular requirements such as the desired scene wavelengths. A typical operating temperature of such a detector is 77° K. for the 8-14 micron (wavelength) infrared spectrum. The detector has a field-of-view along optical axis 2; lens 3 and partial reflector-transmitter member 4 are on the axis. Lens 3 is an objective lens for detector 1, and directs radiation from a distant scene onto the detector, in the usual well-known manner. The radiation from the distant scene, before is reaches lens 3, must pass through member 4. Since 4 is a partial reflector-transmitter, part of the radiation passes through 4, and part reflect along optical axis 5 toward adjustable black-body radiator 6. The problem which the instant invention solves is that, in the absence of elements 4 and 6, not only can detector 1 detect a scene on optical axis 2, but another thermal detector (entitled "Distant Thermal Detector" 7 on the drawing 5) on axis 2, "looking" toward detector 1 would see a cold spot in the scene (environment) of detector 1. For a white-hot detector 7, this cold spot would look like a black hole in the scene containing detector 1. This alerts the operator of detector 7 to the fact that the scene of which he is a part is being observed by another thermal detector, and allows him to take appropriate countermeasures. In the case of military detectors, such countermeasures could be dangerous to the operator of detector 1 and/or could "blind" 1, since the countermeasures could be such things as artillery or missile fire, or a high-power laser beam directed along optical axis 2.

Members 4 and 6 (and projection lens 8 for member 6) mask cooled detector 1 from detection by a distant thermal detector. This is done by adjusting radiator 6 such that its temperature is the same as the ambient temperature around detector 1. Further, lens 8 is adjusted such that the image size of radiator 6 is the same size as that of detector 1 to an observer looking along optical axis 2 toward detector 1. Such an observer would see a scene, not with a black hole, but with a black hole obscured by the radiation from radiator 6; in other words, a normal scene. Obviously, although not specifically stated above, the shape of the image from radiator 6 must be congruent to the black-hole image of detector 1. Moreover, all of elements 1-6, and 8 may be enclosed in a common housing indicated shcematically by dotted-line rectangle 9.

I claim:
1. A thermal black-hole mask for a cooled thermal detector in an uncooled environment, wherein said detector has a field of view on an optical axis, including:
   a partial transmitter-reflector member on said axis and inclined thereto, and
   a black-body radiator adjacent to said member and arranged to direct radiation onto said member at an angle such that said radiation is partially reflected along said optical axis.

2. The mask as set forth in claim 1 whereby said radiator is adjustable to and is adjusted to the temperature of said environment.

3. The mask as set forth in cliam 1 whereby said radiator has an apparent image size and shape the same as said cooled detector.

4. The mask as set forth in claim 2 whereby said radiator has an apparent image size and shape the same as said cooled detector.

* * * * *